UNITED STATES PATENT OFFICE.

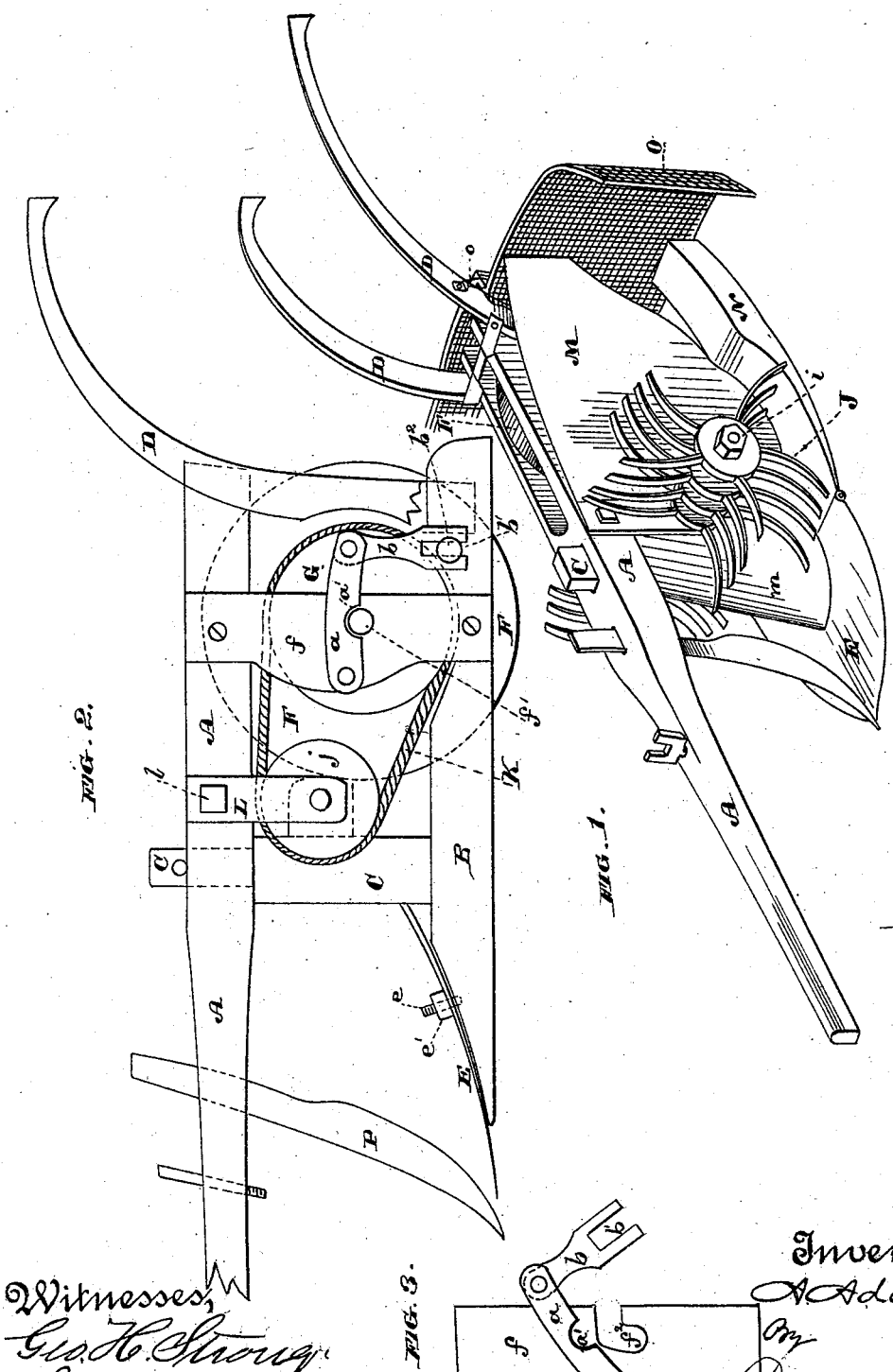

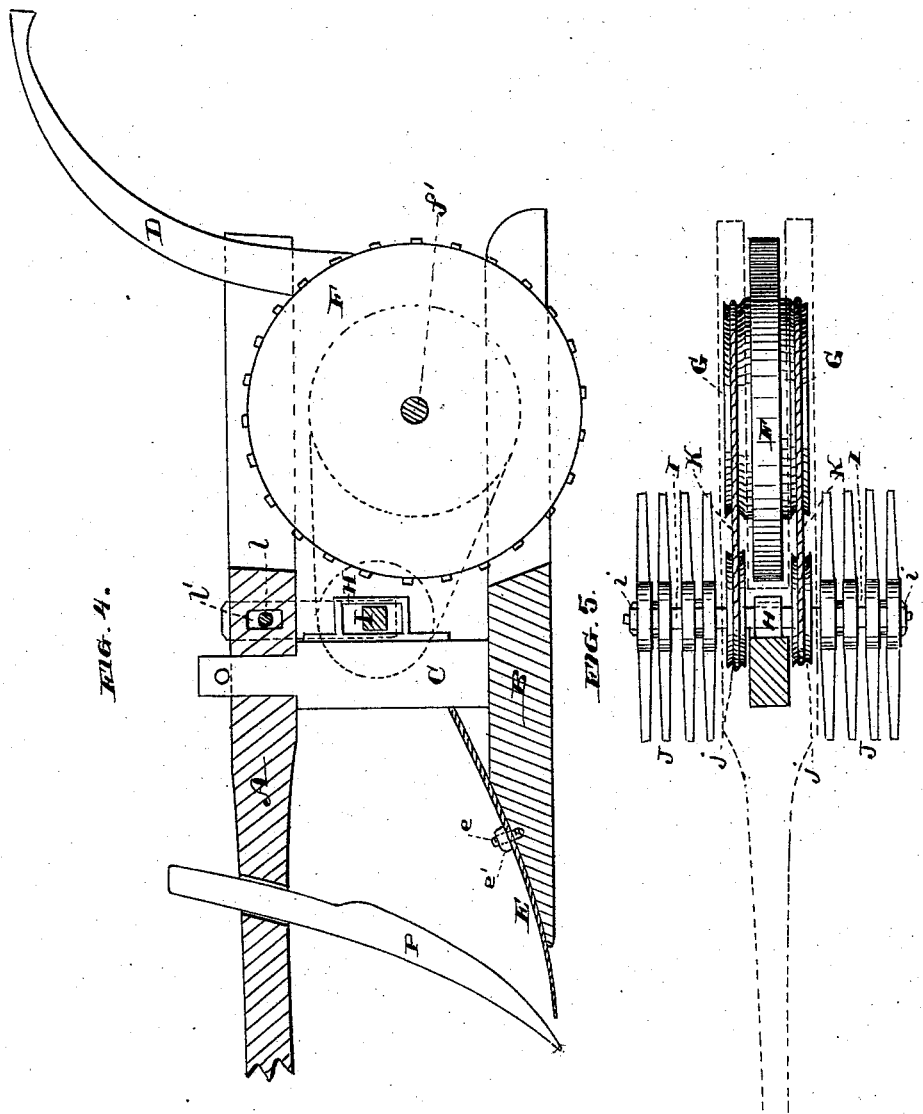

AUGUST ADAM, OF RENO, NEVADA.

POTATO-DIGGER.

SPECIFICATION forming part of Letters Patent No. 290,305, dated December 18, 1883.

Application filed June 26, 1883. (No model.)

*To all whom it may concern:*

Be it known that I, AUGUST ADAM, of Reno, county of Washoe, State of Nevada, have invented an Improvement in Potato-Diggers; and I hereby declare the following to be a full, clear, and exact description thereof.

My invention relates to certain new and useful improvements in potato-diggers.

These improvements consist in means for driving the sifters or rakes with a positive motion, in means for adjusting the sifters, and in means for inclosing the gearing, all of which I shall hereinafter fully explain, reference being made to the accompanying drawings, in which—

Figure 1, Sheet 1, is a perspective view of my potato-digger. Fig. 2 is a side elevation, partly in section. Fig. 3 is a detail showing the means for adjusting the main driving-wheel. Fig. 4, Sheet 2, is a vertical longitudinal section, showing the means for adjusting vertically the shaft I, carrying the sifters. Fig. 5 is a plan showing the sifters and gearing.

A is the beam, and B is the main central runner.

C is a standard connecting the two in front, and D are the handles connecting them behind.

E is a plow secured to the forward end of the runner B by means of bolt $e$ and nut $e'$, whereby it can readily be removed when necessary.

F is the driving-wheel, the rim of which is ribbed, as in wheels of this character in other agricultural implements, such as harvesters, &c. This wheel is mounted between the beam A and runners B, and moves in slots therein. Its lower edge projects through runner B, to take hold of the ground. It is journaled in vertical plates $f$, secured to beam and runner, its axis $f'$ extending through slots $f^2$ in said plates, Fig. 3. It can have a vertical adjustment in its bearing, and is held down to its place by means of pivoted plates $a$, having notches $a'$, fitting the ends of axis $f'$. These plates are secured by other plates, $b$, having slots $b'$ in their lower ends, and secured to the sides of runner B by means of set-screws $b^2$. By raising these plates $b$ the plates $a$ are raised, thus relieving the axis $f'$ and allowing the driving-wheel F to be pressed up. By drawing them down, the wheel is held down as low as desired. Upon each side of wheel F are formed or secured pulleys G, Fig. 5. Upon the back of standard C is an elongated socket-bearing, H, in which is fitted a shaft, I, Fig. 4.

J are the sifters or rakes. These consist of a central hub and radiating teeth. This hub is perforated and is fitted to revolve upon each end of the shaft I. The inner end of the hub is provided with a pulley, $j$, over which a belt or chain, K, from the pulley G passes, whereby the revolution of the main driving-wheel F is transmitted to the sifters, Fig. 5. This motion is a positive one, and is much more effective than if the sifters were made to turn themselves by contact with the ground. The ends of shafts I have nuts $i$, to secure the sifters thereon. These sifters have a vertical adjustment by means of the hangers L, attached to shaft I, and secured by a bolt, $l$, passing through slots $l'$ in their tops into the beam A, Figs. 2 and 4. By raising and fixing the hangers L, the shaft I is raised in its socket-bearing H, and thus carries up the sifters. The gearing mechanism, consisting of the pulleys, chains, and shafts, is incased and protected by the shield-plates M, secured to the beam, the standard, and the handles. These prevent the earth from clogging up the driving-gear, Fig. 1. The front is protected by a cap, $m$, secured to the standard C.

N N are side runners. These are secured to the standard in front and to the handles behind.

O is a piece of cloth serving the purpose of a gatherer or collector of the potatoes after the sifters have raked them. This cloth extends on each side of the implement, and is secured below to the rear ends of the runners N, and above it is secured to the handles by clamps $o$. This cloth may be suitably stiffened by wire ribs; or the gatherer may be made of wire screen, if desirable.

The operation of this implement is as follows: The plow digs out the potatoes, the side runners throw them up to the sifters, which clean the earth away from them, and the cloth O gathers them and prevents them from scattering. The revolution of the sifters is positive and certain.

Having thus described my invention, what I claim as new, and desire to secure by Letters Patent, is—

1. In a potato-digger, the beam A, main runner B, standard C, handles D, and plow E, in combination with the revolving sifters J, the driving-wheel F, centrally arranged and in rear of the sifters, and means for transmitting power from said wheel to the sifters, the side shield-plates, M, the front cap, $m$, and the side runners, N, secured to the standard and handles, substantially as herein described.

2. In a potato-digger, the beam A, runner B, standard C, handles D, and plow E, in combination with the sifters J, the means for rotating them, the shield-plates M and cap $m$, the side runners, N, and the gathering or collecting cloth or screen O, substantially as herein described.

3. In a potato-digger, the beam A, runner B, standard C, handles D, and plow E, in combination with the sifters J, the driving traction-wheel F, connected with said sifters, and the means for vertically adjusting the driving-wheel, consisting of the slotted bearing-plates $f$, in which it is journaled, the pivoted notched plates $a$, and the plates $b$, having slots $b'$ and set-screws $b^2$, all arranged and operating substantially as herein described.

4. In a potato-digger, the beam A, runner B, standard C, handles D, and plow E, in combination with the shaft I, the sifters J, mounted thereon, and the means for vertically adjusting said sifters, consisting of the elongated socket-bearing H, in which the shaft is fitted, the slotted hangers L and bolt $l$, and the vertically-adjustable driving or traction wheel F, all arranged substantially as herein described.

In witness whereof I have hereunto set my hand.

AUGUST ADAM.

Witnesses:
G. H. TAYLOR,
M. J. DILLMAN.